United States Patent
Toya et al.

(10) Patent No.: US 12,183,027 B2
(45) Date of Patent: Dec. 31, 2024

(54) PROCESSING DEVICE, MEASUREMENT DEVICE, AND MEASUREMENT METHOD

(71) Applicant: KABUSHIKI KAISHA TOSHIBA, Tokyo (JP)

(72) Inventors: Kiminori Toya, Yokohama (JP); Hiroshi Ohno, Chuo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 345 days.

(21) Appl. No.: 17/688,940

(22) Filed: Mar. 8, 2022

(65) Prior Publication Data

US 2023/0120069 A1      Apr. 20, 2023

(30) Foreign Application Priority Data

Oct. 14, 2021   (JP) ................................. 2021-168495

(51) Int. Cl.
*G06T 7/70*     (2017.01)
*G01M 11/02*   (2006.01)

(52) U.S. Cl.
CPC ........... *G06T 7/70* (2017.01); *G01M 11/0264* (2013.01)

(58) Field of Classification Search
CPC .............................. G06T 7/70; G01M 11/0264
See application file for complete search history.

(56) References Cited

U.S. PATENT DOCUMENTS

| 2002/0154814 A1 | 10/2002 | Gerhard et al. |
| 2017/0313622 A1 | 11/2017 | Ogami et al. |
| 2019/0062036 A1 | 2/2019 | Yamashita et al. |
| 2019/0156510 A1* | 5/2019 | Mech .................... G06T 7/73 |
| 2020/0286249 A1* | 9/2020 | Toya ..................... G02B 27/14 |

FOREIGN PATENT DOCUMENTS

| JP | WO 2012/081398 A1 | 6/2012 |
| JP | 2017-197408 A | 11/2017 |
| JP | 2020-143917 A | 9/2020 |
| JP | 2022-042674 A | 3/2022 |

OTHER PUBLICATIONS

Gardner et al., "Reference-Free Digital Shadowgraphy Using a Moving BOS Background", Experiments in Fluids 61:44, https://doi.org/10.1007/s00348-019-2865-4, 2020, 5 Pages.

* cited by examiner

*Primary Examiner* — Tarifur R Chowdhury
*Assistant Examiner* — Akbar H. Rizvi
(74) *Attorney, Agent, or Firm* — Maier & Maier, PLLC

(57) ABSTRACT

According to one embodiment, a processing device includes an acquisition part, and a processor. The acquisition part and the processor are configured to perform a first operation. The acquisition part is configured to acquire first image data, second image data, and third image data in the first operation. The first image data includes data related to a first object member image of an object member transmitting a first light. The second image data includes data related to a second object member image of the object member transmitting a second light. The third image data includes data related to a third object member image of the object member transmitting a third light. The processor is configured to derive first derived data based on the first, second, and third image data in the first operation.

17 Claims, 7 Drawing Sheets

PROCESSING DEVICE, MEASUREMENT DEVICE, AND MEASUREMENT METHOD

CROSS-REFERENCE TO RELATED APPLICATIONS

This application is based upon and claims the benefit of priority from Japanese Patent Application No. 2021-168495, filed on Oct. 14, 2021; the entire contents of which are incorporated herein by reference.

FIELD

Embodiments described herein relate generally to a processing device, a measurement device, and a measurement method.

BACKGROUND

There is a measurement device that measures characteristics of, for example, an optical component or the like. It is desirable to improve the accuracy of the measurement device.

DETAILED DESCRIPTION

Figure 1:
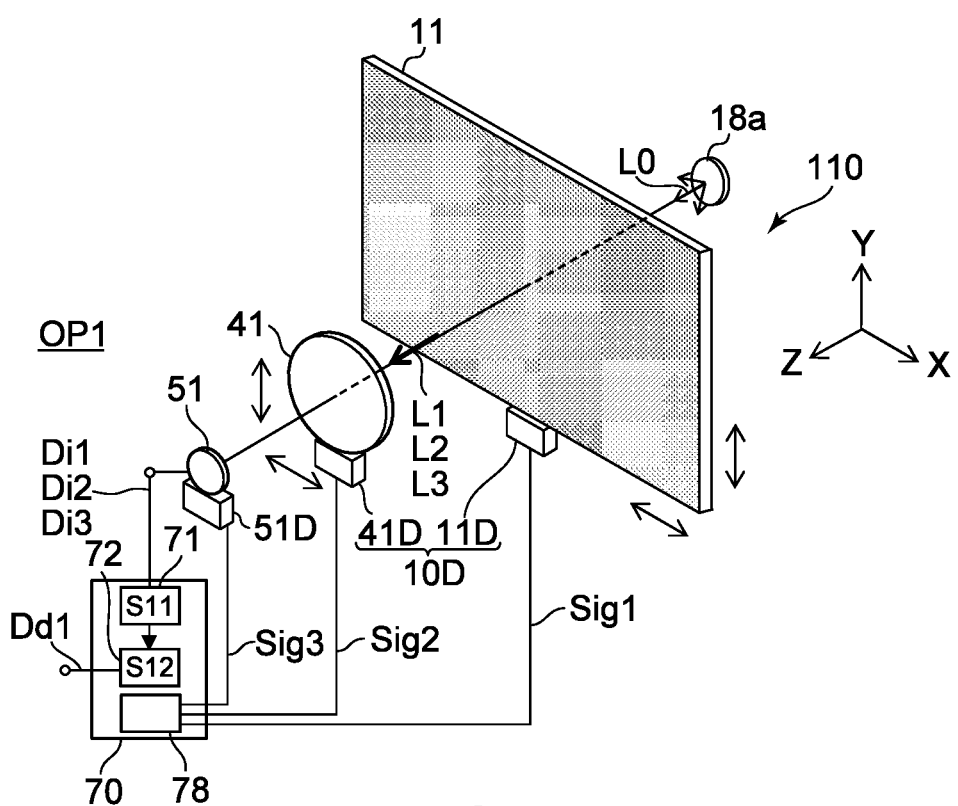
FIG. 1 is a schematic perspective view illustrating a processing device and a measurement device according to a first embodiment.

According to one embodiment, a processing device includes an acquisition part, and a processor. The acquisition part and the processor are configured to perform a first operation. The acquisition part is configured to acquire first image data, second image data, and third image data in the first operation. The first image data includes data related to a first object member image of an object member transmitting a first light. The first light includes a first pattern from a first background image in the first image data. The second image data includes data related to a second object member image of the object member transmitting a second light. The second light includes the first pattern from the first background image in the second image data. The third image data includes data related to a third object member image of the object member transmitting a third light. The third light includes the first pattern from the first background image in the third image data. A second relative position between the first background image in the second image data and the object member in the second image data is different from a first relative position between the first background image in the first image data and the object member in the first image data. A third relative position between the first background image in the third image data and the object member in the third image data is different from the first relative position and different from the second relative position. The processor is configured to derive first derived data based on the first, second, and third image data in the first operation.

According to one embodiment, a measurement device includes the processing device described above, a position modifier configured to modify a relative position between the first background image and the object member, and a first imager configured to acquire the first, second, and third image data.

According to one embodiment, a measurement method is disclosed. The method can include performing a first operation. The first operation includes acquiring first image data, second image data, and third image data, and deriving first derived data based on the first, second, and third image data. The first image data includes data related to a first object member image of an object member transmitting a first light. The first light includes a first pattern from a first background image in the first image data. The second image data includes data related to a second object member image of the object member transmitting a second light. The second light includes the first pattern from the first background image in the second image data. The third image data includes data related to a third object member image of the object member transmitting a third light. The third light includes the first pattern from the first background image in the third image data. A second relative position between the first background image in the second image data and the object member in the second image data is different from a first relative position between the first background image in the first image data and the object member in the first image data. A third relative position between the first background image in the third image data and the object member in the third image data is different from the first relative position and different from the second relative position.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

Exemplary embodiments will now be described with reference to the drawings.

The drawings are schematic or conceptual; and the relationships between the thickness and width of portions, the proportional coefficients of sizes among portions, etc., are not necessarily the same as the actual values thereof. Furthermore, the dimensions and proportional coefficients may be illustrated differently among drawings, even for identical portions.

In the specification of the application and the drawings, components similar to those described in regard to a drawing thereinabove are marked with like reference numerals, and a detailed description is omitted as appropriate.

First Embodiment

FIG. 1 is a schematic perspective view illustrating a processing device and a measurement device according to a first embodiment.

As shown in FIG. 1, the measurement device 110 according to the embodiment includes the processing device 70. In the example, the measurement device 110 further includes a position modifier 10D and a first imager 51. The measurement device 110 may include a first background image 11.

The processing device 70 includes an acquisition part 71 and a processor 72. The acquisition part 71 and the processor 72 are configured to perform a first operation OP1. In the first operation OP1, the acquisition part 71 acquires first image data Di1, second image data Dig, and third image data Di3. In the first operation OP1, the processor 72 derives first derived data Dd1 based on the first to third image data Di1 to Di3. The processor 72 is configured to output the first derived data Dd1 that is derived. Examples of the first derived data Dd1 are described below.

For example, the position modifier 10D is configured to modify a relative position between the first background image 11 and an object member 41. For example, the first imager 51 is configured to acquire the first image data Di1, the second image data Dig, and the third image data Di3. These data that are acquired by the first imager 51 are supplied to the acquisition part 71.

In the example, the measurement device 110 includes a first background image controller 11D and an object member controller 41D. The first background image controller 11D is configured to control the spatial position of the first background image 11. The object member controller 41D is configured to control the spatial position of the object member 41. In the example, the measurement device 110 includes a first imager controller 51D. The first imager controller 51D is configured to control the spatial position of the first imager 51. At least one of the first background image controller 11D or the object member controller 41D may be included in the position modifier 10D. The first imager controller 51D may be included in the position modifier 10D.

The processing device 70 may include a position controller 78. The processing device 70 (e.g., the position controller 78) may control the operation of the first background image controller 11D by supplying a first signal Sg1 to the first background image controller 11D. The processing device 70 (e.g., the position controller 78) may control the operation of the object member controller 41D by supplying a second signal Sg2 to the object member controller 41D. The processing device 70 (e.g., the position controller 78) may control the operation of the first imager controller 51D by supplying a third signal Sg3 to the first imager controller 51D.

For example, the position controller 78 may be controlled by the processor 72. For example, the position controller 78 may be considered to be a portion of the processor 72. For example, the processor 72 may be configured to control at least one of the position modifier 10D or the first imager 51 (e.g., the first imager controller 51D).

A first direction from the first background image 11 toward the object member 41 is taken as a Z-axis direction. One direction perpendicular to the Z-axis direction is taken as an X-axis direction. A direction perpendicular to the Z-axis direction and the X-axis direction is taken as a Y-axis direction.

The first background image controller 11D may be configured to modify the position of the first background image 11 in the X-axis direction, the Y-axis direction, and the Z-axis direction. The object member controller 41D may be configured to modify the position of the object member 41 in the X-axis direction, the Y-axis direction, and the Z-axis direction. The first imager controller 51D may be configured to modify the position of the first imager 51 in the X-axis direction, the Y-axis direction, and the Z-axis direction.

In the example, a light L0 that is emitted from a light source 18a is incident on the member used as the first background image 11. The light that is emitted from the member used as the first background image 11 is incident on the object member 41. The light that is emitted from the object member 41 is incident on the first imager 51. The first imager 51 is configured to acquire the light emitted from the object member 41 and generate data related to an image.

According to the embodiment, the first background image 11 may be an image from any display device. For example, an image that is obtained from a light-emitting display device may be used as the first background image 11. In such a case, the light source 18a can be omitted. The light-emitting display device may be based on, for example, an LED, etc. The first background image 11 may include any pattern (a first pattern). The first pattern may be based on a sheet (paper, a resin sheet, etc.) on which a dot pattern is printed. When a light-emitting display device is used, multiple pixels (multiple light-emitting elements) that are included in the display device may be the first pattern.

The object member 41 transmits at least a portion of the light emitted from the first background image 11. The object member 41 is the object of the measurement. For example, the measurement device 110 (or the processing device 70) is configured to measure or evaluate a characteristic of the object member 41. The characteristic may include at least one of refractive index, stress, temperature, pressure, strain, or density. The refractive index may include birefringence. The characteristic (the refractive index, etc.) of the object member 41 may have a spatial distribution. The measurement device 110 (or the processing device 70) may be configured to evaluate the spatial distribution of the characteristic (the refractive index, etc.) of the object member 41.

According to the embodiment, the first imager 51 generates at least three sets of image data (the first image data Di1, the second image data Dig, and the third image data Di3). The acquisition part 71 acquires the at least three sets of image data.

Figure 2A:
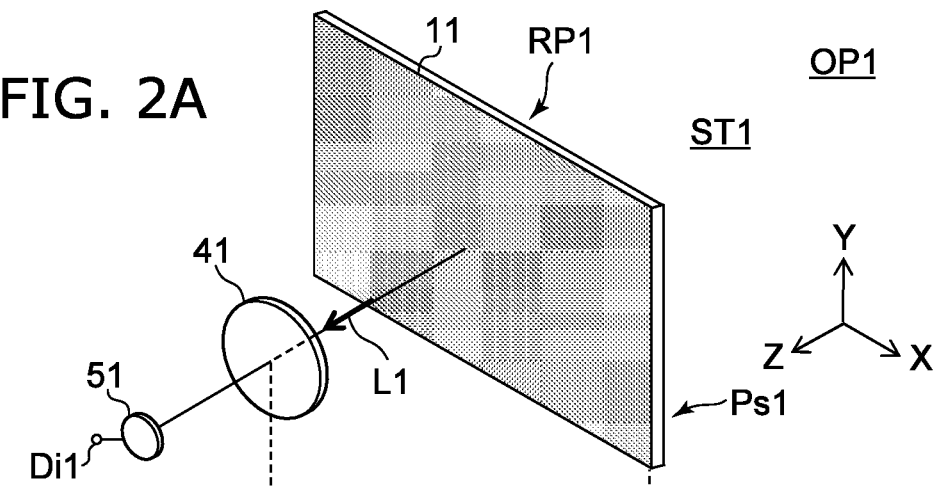
FIGS. 2A to 2C are schematic views illustrating an operation of the processing device and the measurement device according to the first embodiment.
Figure 2B:
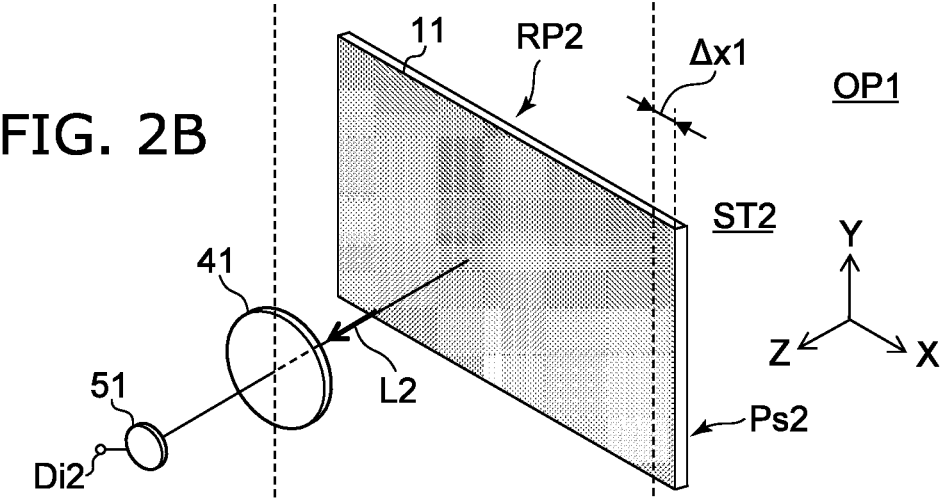
Figure 2C:
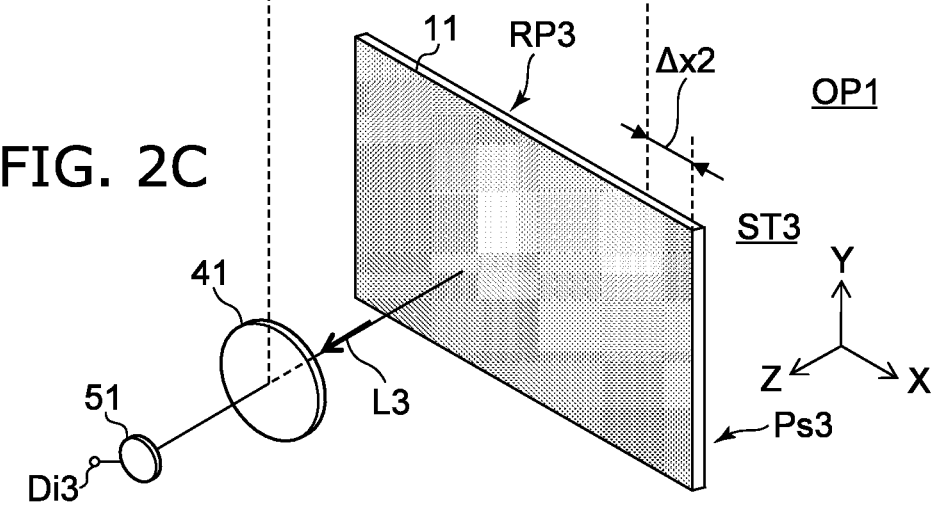

FIGS. 2A to 2C are schematic views illustrating an operation of the processing device and the measurement device according to the first embodiment.

FIGS. 2A to 2C correspond respectively to first to third states ST1 to ST3. The relative position between the first background image 11 and the object member 41 is different between the three states. For example, the position of the first background image 11 when referenced to the position of the object member 41 may be different between the three states. For example, the position of the object member 41 when referenced to the position of the first background image 11 may be different between the three states. The position of the first imager 51 may be modified conjunctively with the change of the relative position. In the example shown in FIGS. 2A to 2C, the position of the object member 41 is substantially fixed, and the position of the first background image 11 is modified.

In the example, a second position Ps2 of the first background image 11 in a second state ST2 is different from a first position Ps1 of the first background image 11 in the first state ST1. A third position Ps3 of the first background image 11 in the third state ST3 is different from the first position Ps1 and different from the second position Ps2. For example, the relative positions are different in a second direction that crosses the first direction (the Z-axis direction). The second direction is, for example, the X-axis direction. The second direction of the change of the relative position may be any direction along the X-Y plane.

The difference (the distance in the second direction) between the second position Ps2 and the first position Ps1 is a first difference Δx1. The difference (the distance in the second direction) between the third position Ps3 and the first position Ps1 is a second difference Δx2. In the example, the second difference Δx2 is greater than the first difference Δx1.

In the first state ST1, a first light L1 that is emitted from the first background image 11 is incident on the object member 41. The first light L1 that passes through the object member 41 is incident on the first imager 51. The first image data Di1 is obtained from the first imager 51. The first image data Di1 corresponds to the first light L1 that passes through the object member 41.

A second light L2 that is emitted from the first background image 11 in the second state ST2 is incident on the object member 41. The second light L2 that passes through the object member 41 is incident on the first imager 51. The second image data Di2 is obtained from the first imager 51. The second image data Di2 corresponds to the second light L2 that passes through the object member 41.

A third light L3 that is emitted from the first background image 11 in the third state ST3 is incident on the object member 41. The third light L3 that passes through the object member 41 is incident on the first imager 51. The third image data Di3 is obtained from the first imager 51. The third image data Di3 corresponds to the third light L3 that passes through the object member 41.

The first image data Di1 is obtained in the first state ST1. The second image data Di2 is obtained in the second state ST2. The third image data Di3 is obtained in the third state ST3. The first light L1, the second light L2, and the third light L3 include a pattern (the first pattern) included in the first background image 11.

In the first state ST1, the relative position between the first background image 11 in the first image data Di1 and the object member 41 in the first image data Di1 is a first relative position RP1. In the second state ST2, the relative position between the first background image 11 in the second image data Di2 and the object member 41 in the second image data Di2 is a second relative position RP2. In the third state ST3, the relative position between the first background image 11 in the third image data Di3 and the object member 41 in the third image data Di3 is a third relative position RP3.

FIGS. 3A to 3D are schematic views illustrating the operation of the processing device and the measurement device according to the first embodiment.

Figure 3A:
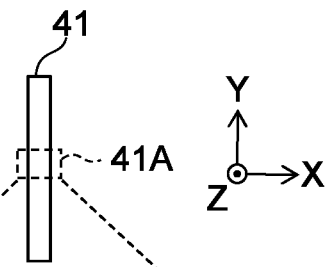
FIGS. 3A to 3D are schematic views illustrating the operation of the processing device and the measurement device according to the first embodiment.

FIG. 3A illustrates the object member 41. In the example, the object member 41 is an optical component. The object member 41 is, for example, a lens. For example, the lens may be placed in a refractive index matching medium that matches the refractive index of the lens. The refractive index matching medium may include, for example, a liquid. The refractive index matching medium may be omitted. In the example, a portion 41A of the object member 41 is imaged.

Figure 3B:
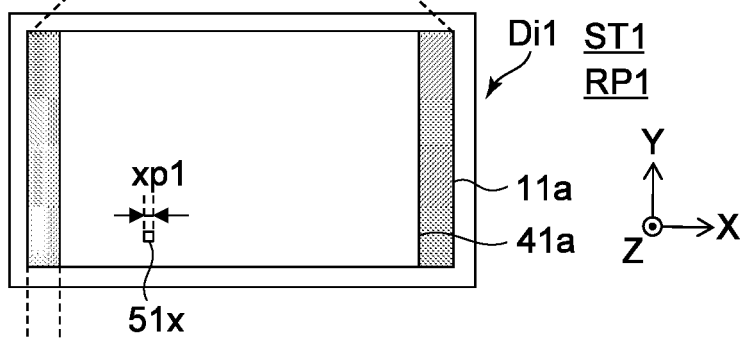

FIG. 3B corresponds to the first image data Di1. The first image data Di1 includes data related to a first object member image 41a of the object member 41 transmitting the first light L1 from a first background image 11a in the first image data Di1. The first image data Di1 includes, for example, data related to the first object member image 41a of the object member 41 transmitting the first light L1 from the first background image 11a in the first state ST1. The first image data Di1 may include data related to the first background image 11a in the first image data Di1 and the first object member image 41a of the object member 41 transmitting the first light L1 from the first background image 11a in the first image data Di1. The first image data Di1 may include, for example, data related to the first background image 11a in the first state ST1 and the first object member image 41a of the object member 41 transmitting the first light L1 from the first background image 11a in the first state ST1.

Figure 3C:
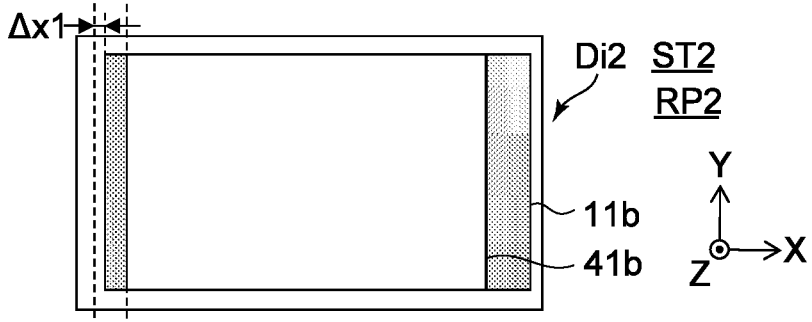

FIG. 3C corresponds to the second image data Di2. The second image data Di2 includes data related to a second object member image 41b of the object member 41 transmitting the second light L2 from a first background image 11b in the second image data Di2. The second image data Di2 includes, for example, data related to the second object member image 41b of the object member 41 transmitting the second light L2 from the first background image 11b in the second state ST2. The second image data Di2 may include data related to the first background image 11b in the second image data Di2 and the second object member image 41b of the object member 41 transmitting the second light L2 from the first background image 11b in the second image data Di2. The second image data Di2 includes, for example, data related to the first background image 11b in the second state ST2 and the second object member image 41b of the object member 41 transmitting the second light L2 from the first background image 11b in the second state ST2.

Figure 3D:
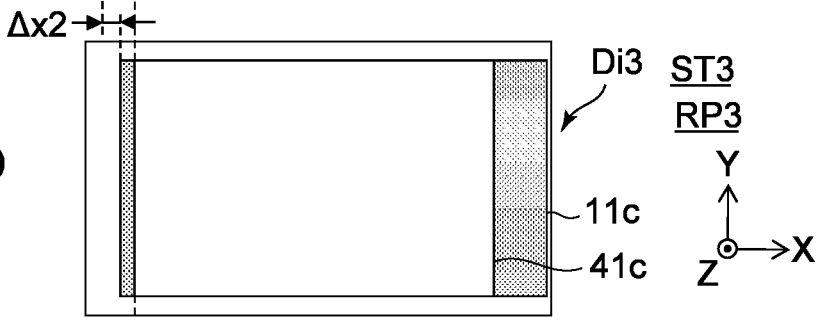

FIG. 3D corresponds to the third image data Di3. The third image data Di3 includes data related to a third object member image 41c of the object member 41 transmitting the third light L3 from a first background image 11c in the third image data Di3. The third image data Di3 includes, for example, data related to the first background image 11c in the third state ST3 and the third object member image 41c of the object member 41 transmitting the third light L3 from the first background image 11c in the third state ST3. The third image data Di3 may include data related to the first background image 11c in the third image data Di3 and the third object member image 41c of the object member 41 transmitting the third light L3 from the first background image 11c in the third image data Di3. The third image data Di3 may include, for example, data related to the first background image 11c in the third state ST3 and the third object member image 41c of the object member 41 transmitting the third light L3 from the first background image 11c in the third state ST3.

The second relative position RP2 between the first background image 11b in the second image data Di2 and the object member 41 in the second image data Di2 is different from the first relative position RP1 between the first background image 11a in the first image data Di1 and the object member 41 in the first image data Di1.

The third relative position RP3 between the first background image 11c in the third image data Di3 and the object member 41 in the third image data Di3 is different from the first relative position RP1. The third relative position RP3 is different from the second relative position RP2.

The processor 72 derives the first derived data Dd1 described below based on such first image data Di1, such second image data Di2, and such third image data Di3 in the first operation OP1.

For example, the processor 72 obtains the first difference Δx1 and the second difference Δx2 in the first operation OP1. When the first background image 11 is moved by the position controller 78, etc., the information that is related to the first difference Δx1 and the second difference Δx2 is supplied from the position controller 78, etc., to the processor 72. As shown in FIG. 3C, the first difference Δx1 corresponds to the difference between the first relative position RP1 and the second relative position RP2. As shown in FIG. 3D, the second difference Δx2 corresponds to the difference between the first relative position RP1 and the third relative position RP3. The processor 72 derives the first derived data Dd1 based on the first difference Δx1 and the second difference Δx2 in the first operation OP1.

The first derived data Dd1 includes data related to the displacement amount of the first pattern. In the derivation of the first derived data Dd1, a first derived relative position between the first background image 11 and the object member 41 is different from the second relative position RP2 and different from the third relative position RP3.

Figure 4:
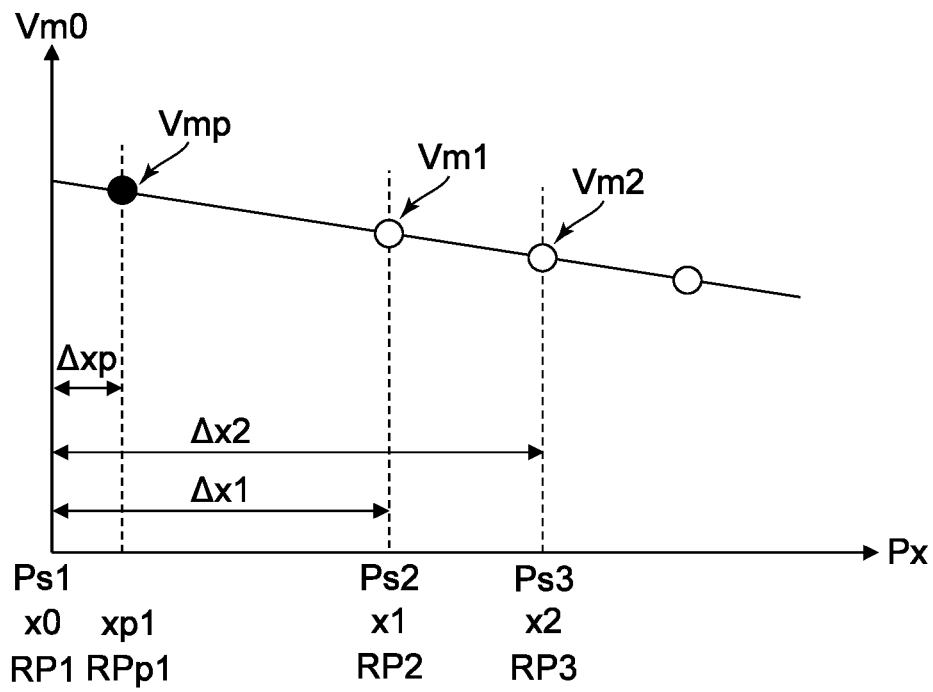
FIG. 4 is a schematic view illustrating the operation of the processing device and the measurement device according to the first embodiment.

FIG. 4 is a schematic view illustrating the operation of the processing device and the measurement device according to the first embodiment.

The horizontal axis of FIG. 4 is a position Px in the second direction (e.g., the X-axis direction). The travel direction of the light that is emitted from the first background image 11 and passes through the object member 41 changes according to the distribution of the characteristic (the density, etc., described above) of the object member 41. The image data that is obtained by the first imager 51 includes a value related to the change (the displacement amount) of the travel direction of the first background image 11 in the light passing through the object member 41. For example, when the first background image 11 is moved from the reference position to the position Px, a movement amount λ, in the image data (the measured value) obtained by the first imager 51 includes a value related to a displacement amount λp that corresponds to the distribution of the characteristic of the object member 41 in addition to the movement amount (a difference Δxp) of the first background image 11 to the position Px. The movement amount λ of the first pattern that is measured corresponds to the displacement amount λp that corresponds to the distribution of the characteristic of the object member 41.

For example, the displacement amount λp that corresponds to the distribution of the characteristic of the object member 41 corresponds to the distance (the measured movement amount λ of the first pattern) between the dots (the first pattern) of the image of the object member 41 transmitting the light from the first background image 11 at the reference position and the dots (the first pattern) of the image of the object member 41 transmitting the light from the first background image 11 at the position Px. The vertical axis of FIG. 4 is a value Vm0 of the image data. For example, the value Vm0 corresponds to the difference between the measured distance described above (the movement amount λ of the first pattern) and the distance between the reference position and the position Px. The reference position is, for example, the first position Ps1 of the first background image 11 in the first state ST1.

As shown in FIG. 4, the first position Ps1 of the first background image 11 in the first state ST1 corresponds to a position x0. The second position Ps2 of the first background image 11 in the second state ST2 corresponds to a position x1. The third position Ps3 of the first background image 11 in the third state ST3 corresponds to a position x2. The difference (the distance in the second direction) between the position x0 and the position x1 corresponds to the first difference Δx1. The difference (the distance in the second direction) between the position x0 and the position x2 corresponds to the second difference Δx2.

As shown in FIG. 4, a value Vm1 is obtained at the second position Ps2 of the first background image 11 (the second state ST2). For example, the value Vm1 is obtained from the first and second image data Di1 and Di2. A value Vm2 is obtained at the third position Ps3 of the first background image 11 (the third state ST3). For example, the value Vm2 is obtained from the first and third image data Di1 and Di3. The value Vm0 (the displacement amount λp of the first pattern) can be derived at any position Px based on the first difference Δx1, the second difference Δx2, the value Vm1, and the value Vm2.

For example, a function can be derived based on the first difference Δx1, the second difference Δx2, the value Vm1, and the value Vm2. The function may include a linear function or a polynomial function. The value Vm0 can be derived at any position Px based on the function.

For example, the first derived data Dd1 corresponds to the value Vm0 at any position Px. For example, the first derived data Dd1 corresponds to a value Vmp at one position xp1 (see FIG. 4). The position xp1 illustrated in FIG. 4 corresponds to the first derived relative position described above. As shown in FIG. 4, a first derived relative position RPp1 (corresponding to the position xp1) between the first background image 11 and the object member 41 in the derivation of the first derived data Dd1 is different from the second relative position RP2 and different from the third relative position RP3.

As described above, the first light L1 (see FIG. 2A) is along the first direction (the Z-axis direction) from the first background image 11 toward the object member 41 in the first image data Di1. The second relative position RP2 is different from the first relative position RP1 in the second direction that crosses the first direction. The third relative position RP3 is different from the first relative position RP1 in the second direction. The second direction is, for example, one direction along the X-Y plane and is, for example, the X-axis direction. The first derived relative position RPp1 is different from the second relative position RP2 in the second direction and different from the third relative position RP3 in the second direction.

For example, the first derived relative position RPp1 corresponds to the position xp1 in the second direction. The difference (the distance in the second direction) between the position x0 and the position xp1 corresponds to the difference Δxp. In one example, the absolute value of the difference Δxp between the first relative position RP1 and the first derived relative position RPp1 is less than the absolute value of the first difference Δx1 and less than the absolute value of the second difference Δx1. The first derived relative position RPp1 may substantially match the first relative position RP1.

For example, the first derived data Dd1 corresponds to data when the movement (the change of the position) of the first background image 11 when referenced to the first position Ps1 is small. Data that corresponds to a small movement (a micro change of the position) is obtained as the first derived data Dd1.

In one example, the value Vmp (the displacement amount λp of the first pattern) may be derived based on the following first formula.

$$Vmp = \frac{\lambda - \Delta xp}{\Delta xp} \propto \int \left[\frac{\partial^2 n}{\partial x^2}\right] dz \qquad (1)$$

In the first formula, "n" is the refractive index of the object member 41. As described above, the refractive index may have a spatial distribution. The displacement amount λp of the first pattern corresponds to the difference between the difference Δxp and the movement amount λ of the first pattern. The first derived data Dd1 is, for example, the value Vmp and corresponds to the value of the displacement amount λp of the first pattern normalized by dividing by the difference Δxp. The first derived data Dd1 corresponds to the value of a second-order derivative of the refractive index. For example, the first derived data Dd1 corresponds to a space derivative of the refractive index gradient. The first derived data Dd1 corresponds to a second-order space derivative related to the movement direction of the first background image 11.

According to the embodiment, for example, the first derived data Dd1 that corresponds to a small movement can be more accurately obtained.

For example, noise is easily generated in the image data when obtaining image data of a small movement distance as the second image data Dig or the third image data Di3 described above. For example, it is considered that the noise is generated when moving two images a movement amount that is about the pixel pitch and estimating the movement amount by using the luminance distribution of the pixels at the periphery, etc. For example, there are also cases where the noise is caused by an optical flow algorithm when detecting movement that is not more than one pixel. For example, it is difficult to acquire image data of a small movement distance while suppressing the noise. For example, when the movement is performed by a motor, noise may be caused by fluctuation of the movement amount of one step of the motor, fluctuation in the drive transmission mechanism located between the motor and the background image, etc. When the movement is performed by moving an image in a display, noise may result from not being able to move a distance that is less than the pixel pitch.

According to the embodiment, image data of large movement distances can be used as the second and third image data Di2 and Di3. The noise can be suppressed thereby. The first derived data Dd1 at any movement distance is derived based on the second and third image data Di2 and Di3 at large movement distances. For example, a second-order differential characteristic is obtained thereby, while suppressing the noise. Higher-accuracy measurements are practically possible.

According to the embodiment, the movement direction (the second direction) of the first background image 11 may cross (e.g., be oblique to) the X-axis direction. In such a case, for example, the displacement of the pattern may be calculated in the X-axis direction and the Y-axis direction from the measured image; and second-order space derivatives in each of the X-axis direction and the Y-axis direction may be obtained. Or, the movement direction may be defined as the X-axis direction. The X-axis direction may cross the weight direction of the space.

The first derived data Dd1 (e.g., the value Vmp) described above may be two-dimensionally derived along, for example, the X-Y plane. For example, the in-plane distribution of the optical characteristics of the object member 41 are obtained.

Figure 5:
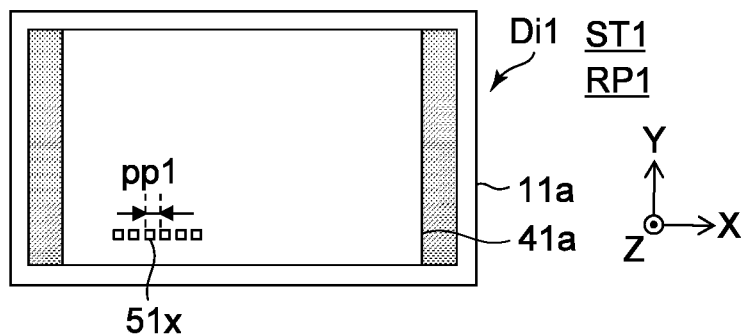
FIG. 5 is a schematic view illustrating the processing device according to the first embodiment.

FIG. 5 is a schematic view illustrating the processing device according to the first embodiment.

The first imager 51 that acquires the image data includes multiple pixels. FIG. 5 illustrates a portion of multiple pixels 51x in the image. The multiple pixels 51x have a pitch pp1 in the second direction (in the example, the X-axis direction).

For example, in one example, the absolute value of the difference Δxp between the first relative position RP1 and the first derived relative position RPp1 (see FIG. 4) may be not more than 5 times the length of the pitch pp1 in the second direction of the multiple pixels 51x of the first imager 51 in the image of the first image data Di1. The absolute value of the difference Δxp may be not more than the length of the pitch pp1 in the second direction of the multiple pixels 51x of the first imager 51 in the image of the first image data Di1. For example, the subpixel positions are estimated when using the first imager 51 to detect a movement amount that is not more than the pitch pp1. The noise that is caused by the estimation of the subpixel positions can be effectively suppressed when the absolute value of the difference Δxp is not more than the length of the pitch pp1 in the second direction of the multiple pixels 51x of the first imager 51 in the image of the first image data Di1.

On the other hand, the first difference Δx1 and the second difference Δx2 may be large. For example, the absolute value of the first difference Δx1 and the absolute value of the second difference Δx2 may be greater than 5 times the length of the pitch pp1 in the second direction of the multiple pixels 51x of the first imager 51 in the image of the first image data Di1. As described above, the first imager 51 acquires the first image data Di1, the second image data Dig, and the third image data Di3.

According to the embodiment, for example, data that is related to the first background image 11 at multiple relative positions may be acquired and stored beforehand.

According to the embodiment, for example, the second position Ps2 (the position x1) is between the first position Ps1 (the position x0) and the third position Ps3 (the position x2) (see FIG. 4). According to the embodiment, the first position Ps1 (the position x0) may be between the second position Ps2 (the position x1) and the third position Ps3 (the position x2). The direction of the movement (positive or negative) is arbitrary.

Figure 6:
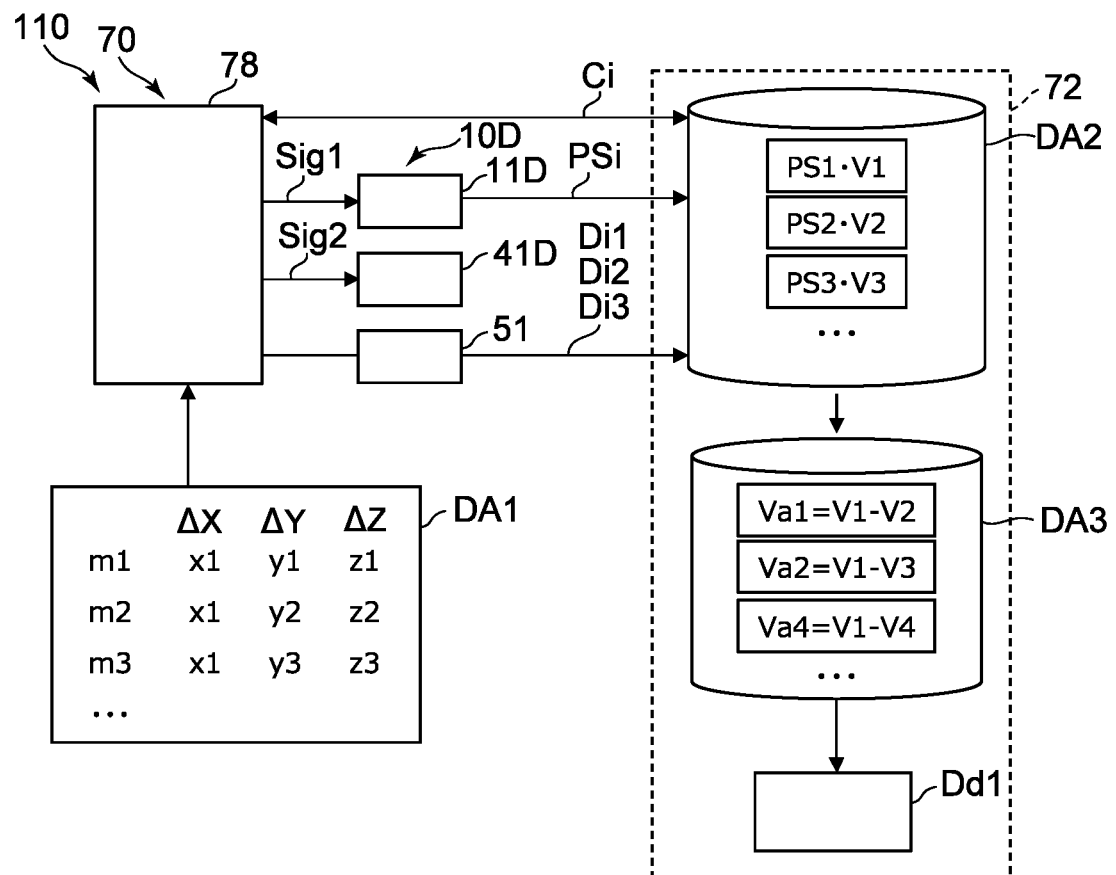
FIG. 6 is a schematic view illustrating the operation of the processing device and the measurement device according to the first embodiment.

FIG. 6 is a schematic view illustrating the operation of the processing device and the measurement device according to the first embodiment.

As shown in FIG. 6, the first background image controller 11D is controlled by the first signal Sg1 supplied to the first background image controller 11D from the position controller 78 of the processing device 70. The operation of the object member controller 41D may be controlled by the second signal Sg2 supplied to the object member controller 41D from the position controller 78 of the processing device 70. The modification of the relative position may be performed by at least one of the first background image controller 11D or the object member controller 41D. For example, measurement position information Psi is supplied from the first background image controller 11D to the processor 72. On the other hand, the image data (the first to third image data Di1 to Di3, etc.) that is obtained from the first imager 51 is supplied to the processor 72. For example, the processing device 70 may function as a measurement method command center.

For example, the operation of the measurement method command center described above may be performed based on first stored data DA1. The positions of the first background image 11 (relative positions Δx, Δy, and Δz) of the measurement are defined by the first stored data DA1. For example, the position of a measurement m1 is defined by the position (x1, y1, z1). The position of a measurement m2 is defined by the position (x1, y2, z2). The position of a measurement m3 is defined by the position (x1, y3, z3).

Based on the positions defined by the first stored data DA1, the position of at least one of the first background image controller 11D or the object member controller 41D is modified, and the imaging (the acquisition of the image data) is performed by the first imager 51. Thus, the first image data Di1, the second image data Dig, and the third image data Di3 may be acquired based on the first stored data DA1. The first stored data DA1 includes information related to multiple relative positions that are related to the first background image 11 and the object member 41.

Data DA2 (information) that is related to sets of measurement positions and measured values is acquired by the processor 72. For example, a set that includes a measurement position PS1 and a measured value V1 at the measurement position PS1 is acquired and stored as a portion of the data DA2. For example, a set that includes a measurement position PS2 and a measured value V2 at the measurement position PS2 is acquired and stored as a portion of the data DA2. For example, a set that includes a measurement position PS3 and a measured value V3 at the measurement position PS3 is acquired and stored as a portion of the data DA2. The data DA2 is related to data images that include the first background image 11 and the object member 41.

For example, the processor 72 derives data DA3 that is related to the movement amount or the displacement amount based on the data DA2. For example, a difference Va1 between the measured value V1 and the measured value V2 is derived and stored as a portion of the data DA3. For example, a difference Va2 between the measured value V1 and the measured value V3 is derived and stored as a portion of the data DA3. For example, a difference Va4 between the measured value V1 and a measured value V4 is derived and stored as a portion of the data DA3.

Based on the data DA3, the processor 72 derives the value Vmp at any position xp (e.g., the position xp1) (see FIG. 4) as the first derived data Dd1.

The first stored data DA1, the data DA2, and the data DA3 may be stored in any memory.

According to the embodiment, a table (the first stored data DA1) that defines the positions of the first background image 11 may be included as described above. According to the embodiment, a detection function for insufficient measurement may be included. For example, the acquisition part 71 acquires multiple sets of image data in the first operation OP1. One of the multiple sets of image data includes data related to the first background image 11 in one of the multiple states and an image of the object member 41 transmitting the light from the first background image 11 in the one of the multiple states. In the first operation OP1, the processor 72 includes deriving the first derived data Dd1 based on the multiple sets of image data and at least a portion of the first stored data DA1. The processor 72 may be configured to output information Ci related to insufficient data in the first operation OP1 by comparing the multiple sets of image data and the at least a portion of the first stored data DA1. For example, the measurement may be performed utilizing the information Ci. An efficient measurement is possible thereby.

According to the embodiment, a position that is not included in the table (the first stored data DA1) defining the positions of the first background image 11 may be derived by interpolating based on the table. The measurement (the acquisition of the image data) may be performed based on the interpolated position. The interpolation may include any function (e.g., a linear function, a polynomial function, etc.).

According to the embodiment, any function based on multiple differences (e.g., the first difference Δx1 and the second difference Δx2) related to the movement amount may be used. The function may be stored in any memory. The function may include, for example, a linear function or a polynomial function (e.g., a spline function).

According to the embodiment, the first derived data Dd1 may include a derivative based on the multiple differences (e.g., the first difference Δx1 and the second difference Δx2) related to the movement amount. The derivative may include, for example, a second-order derivative.

As described with reference to FIG. 3A, the operation described above may be performed for the portion 41A of the object member 41. In such a case, image data that is related to multiple imaging regions may be acquired by modifying the imaging region. For example, the measurement (the acquisition of the image data) is performed by scanning when the object member 41 is large. In such a case, the spatial position of the object member 41 may be modified. For example, the spatial positions of the first imager 51 and the first background image 11 may be modified. The direction of the modification of the position may include at least one of an X-axis direction component or a Y-axis direction component. The direction of the modification of the position may include a rotation-direction component around the Z-axis direction. The direction of the modification of the position may include a Z-axis direction component.

The measurement device 110 according to the embodiment may include a predetermined operation sequence. For example, the predetermined operation sequence can be performed before a measurement by a user. An appropriate movement may be derived by the operation sequence.

The embodiment is applicable to multiple measurement devices. There are cases where unique fluctuation exists in each of the multiple measurement devices. The first stored data DA1 that corresponds to each of the multiple measurement devices may be included.

According to the embodiment as described above, a display device (a light-emitting element) is applicable as the first background image 11. Colored light may be emitted from the display device. In such a case, the image data may include information related to light of multiple colors (e.g., green, blue, etc.). According to the embodiment, for example, data may be acquired at multiple light emission wavelengths. The data may be obtained by the first imager 51.

The first background image 11 may include information related to the length (e.g., the scale). For example, the image data may include information related to a length included in the first background image 11. It is easy to ascertain the magnification in the imaging.

According to the embodiment, calibration data is applicable. The calibration data includes, for example, data of the characteristic (refractive index, stress, temperature, pressure, strain, density, etc.) related to a known member. For example, the dedicated movable stage, etc., may be provided.

According to the embodiment, a second operation may be performed.

Figure 7A:
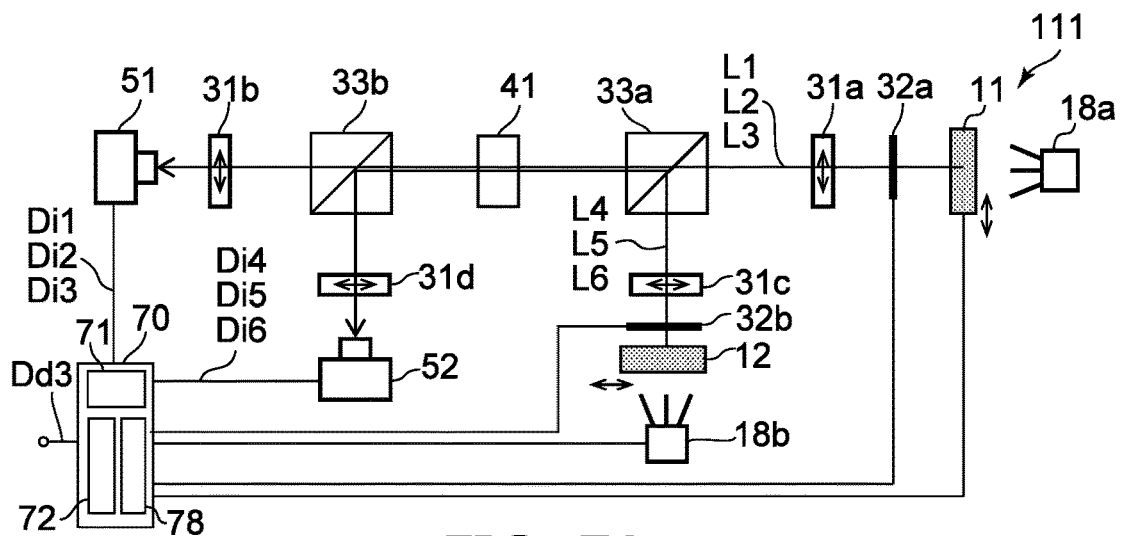
FIGS. 7A to 7C are schematic views illustrating a processing device and a measurement device according to the first embodiment.
Figure 7B:
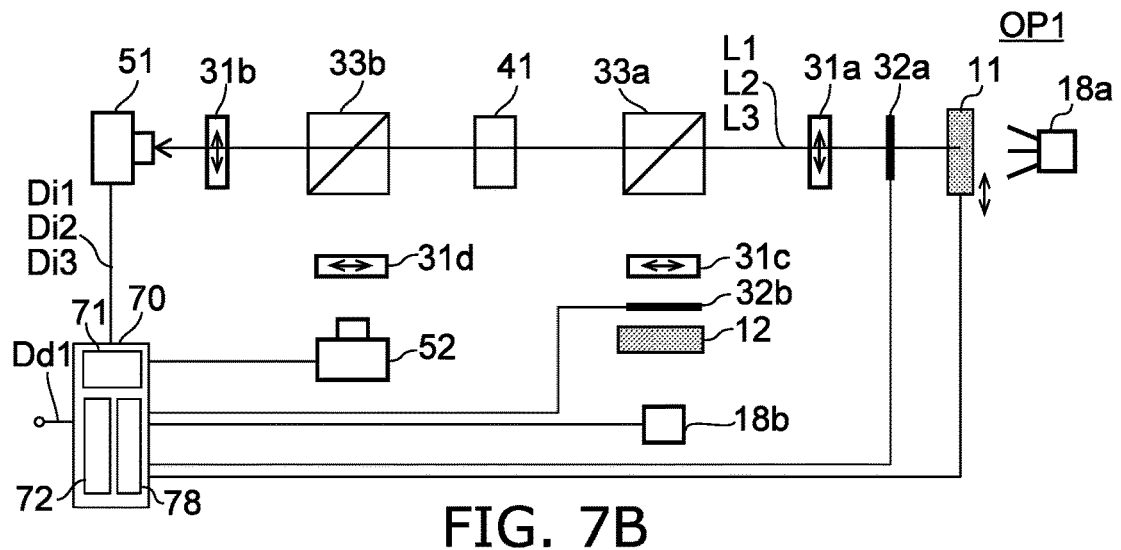
Figure 7C:
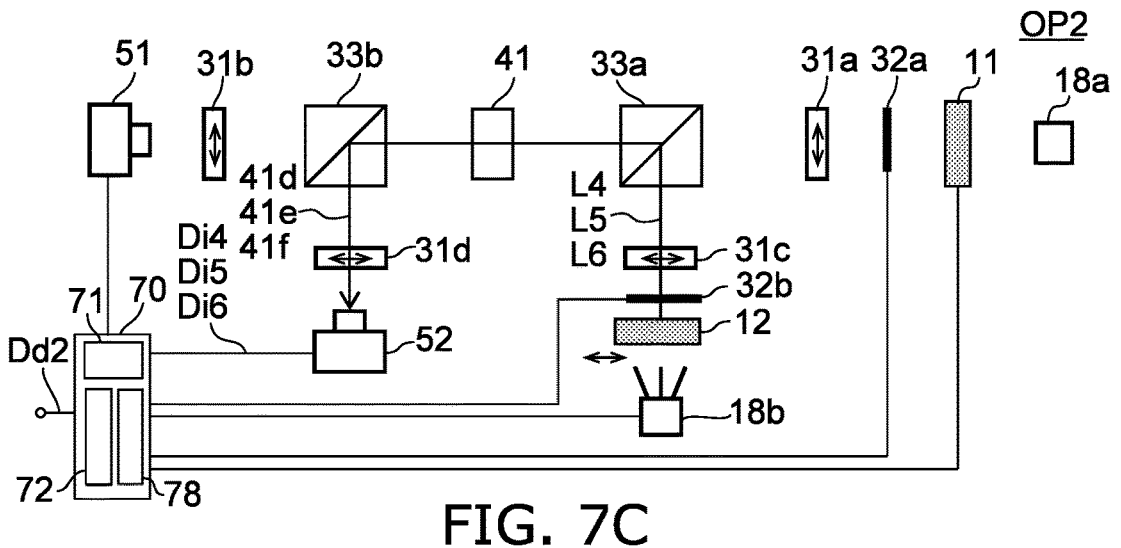

FIGS. 7A to 7C are schematic views illustrating a processing device and a measurement device according to the first embodiment.

The first operation OP1 and a second operation OP2 are possible in the measurement device 111 (and the processing device 70) according to the embodiment shown in FIG. 7A. The measurement device 111 includes the processing device 70, the first background image 11, a second background image 12, the first imager 51, and a second imager 52.

A first beam splitter 33a is located in the optical path between the first background image 11 and the object member 41. A second beam splitter 33b is located in the optical path between the object member 41 and the first imager 51.

In the first operation OP1 shown in FIG. 7B, the light (the first to third light L1 to L3) that is emitted from the first background image 11 passes through the first beam splitter 33a and is incident on the object member 41. The light that is transmitted by the object member 41 passes through the second beam splitter 33b and is incident on the first imager 51. Multiple sets of image data (the first to third image data Di1 to Di3) are acquired by the first imager 51.

In the second operation OP2 shown in FIG. 7C, light (fourth to sixth light L4 to L6) that is emitted from the second background image 12 passes through the first beam splitter 33a and is incident on the object member 41. The light that is transmitted by the object member 41 passes through the second beam splitter 33b and is incident on the second imager 52. Multiple sets of image data (fourth to sixth image data Di4 to Di6) are acquired by the second imager 52. The second background image 12 includes a second pattern.

The operation can be switched between the first operation OP1 and the second operation OP2.

As shown in FIG. 7C, for example, the acquisition part 71 and the processor 72 also are configured to perform the second operation OP2. In the second operation OP2, the acquisition part 71 acquires the fourth image data Di4, the fifth image data Di5, and the sixth image data Di6.

The fourth image data Di4 includes data related to a fourth object member image 41d of the object member 41 transmitting a fourth light L4 including the second pattern from the second background image 12 in the fourth image data Di4. The fourth image data Di4 may include data related to the second background image 12 in the fourth image data Di4 and the fourth object member image 41d of the object member 41 transmitting the fourth light L4 including the second pattern from the second background image 12 in the fourth image data Di4.

The fifth image data Di5 includes data related to a fifth object member image 41e of the object member 41 transmitting a fifth light L5 including the second pattern from the second background image 12 in the fifth image data Di5. The fifth image data Di5 may include data related to the second background image 12 in the fifth image data Di5 and the fifth object member image 41e of the object member 41 transmitting the fifth light L5 including the second pattern from the second background image 12 in the fifth image data Di5.

The sixth image data Di6 includes data related to a sixth object member image 41f of the object member 41 transmitting a sixth light L6 including the second pattern from the second background image 12 in the sixth image data Di6. The sixth image data Di6 may include data related to the second background image 12 in the sixth image data Di6 and the sixth object member image 41f of the object member 41 transmitting the sixth light L6 including the second pattern from the second background image 12 in the sixth image data Di6.

The fifth relative position between the second background image 12 in the fifth image data Di5 and the object member 41 in the fifth image data Di5 is different from a fourth relative position between the second background image 12 in the fourth image data Di4 and the object member 41 in the fourth image data Di4. A sixth relative position between the second background image 12 in the sixth image data Di6 and the object member 41 in the sixth image data Di6 is different from the fourth relative position and different from the fifth relative position.

In the second operation OP2, the processor 72 derives second derived data Dd2 based on the fourth to sixth image data Di4 to Di6.

The second derived data Dd2 includes data related to the displacement amount of the second pattern. A second derived relative position between the second background image 12 and the object member 41 in the derivation of the second derived data Dd2 is different from the fifth relative position and different from the sixth relative position.

The processor 72 may be configured to output third derived data Dd3 in the second operation OP2 (see FIG. 7A). The third derived data Dd3 includes the difference between the first derived data Dd1 and the second derived data Dd2.

By using two sets of derived data, the measurement can be performed with higher temporal resolution.

In the example, a first polarizing filter 31a is located in the optical path between the first background image 11 and the first beam splitter 33a. A second polarizing filter 31b is located in the optical path between the second beam splitter 33b and the first imager 51. The first to third light L1 to L3 are polarized light.

In the example, a third polarizing filter 31c is located in the optical path between the second background image 12 and the first beam splitter 33a. A fourth polarizing filter 31d is located in the optical path between the second beam splitter 33b and the second imager 52. The fourth to sixth light L4 to L6 are polarized light.

The polarizing axis of the first polarizing filter 31a crosses the polarizing axis of the third polarizing filter 31c. For example, the polarizing axis of the first polarizing filter 31a is orthogonal to the polarizing axis of the third polarizing filter 31c. The polarization direction of the first light L1 crosses the polarization direction of the fourth light L4. For example, the polarization direction of the first light L1 is orthogonal to the polarization direction of the fourth light L4.

For example, information that is related to the birefringence is obtained by using multiple light of different polarization directions in the measurement. For example, a physical quantity including at least one of density, refractive index, stress, or temperature can be effectively detected (measured). When polarized light is used, the plane of polarization is substantially unchanged (not rotated) by the beam splitter.

In the example, the first to third light L1 to L3 are generated by the light from the light source 18a entering the first background image 11. The fourth to sixth light L4 to L6 are generated by the light from the light source 18b entering the second background image 12. At least one of the first background image 11 or the second background image 12 may include a light-emitting element (e.g., a display device, etc.).

In the example, a first optical switch 32a (a shutter) is located in the optical path between the first background image 11 and the first beam splitter 33a. A second optical switch 32b (a shutter) is located in the optical path between the second background image 12 and the first beam splitter 33a. The first operation OP1 and the second operation OP2 may be switched by these optical switches.

Figure 8:
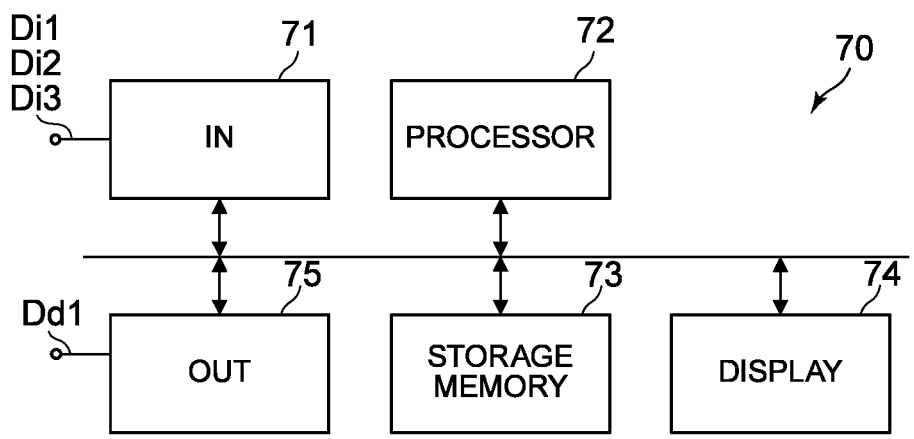
FIG. 8 is a schematic view illustrating the processing device according to the first embodiment.

FIG. 8 is a schematic view illustrating the processing device according to the first embodiment.

FIG. 8 is a block diagram related to the processing device 70. As shown in FIG. 8, the processing device 70 includes the acquisition part 71 and the processor 72. The processing device 70 may include, for example, an output part 75. The processor 72 may output processing results (e.g., the first derived data Dd1, etc.) via the output part 75. The output part 75 is, for example, an output port. The acquisition part 71 may have an input function and an output function. In such a case, the output part 75 may be omitted. The acquisition part 71 is, for example, an input/output port. The processor 72 includes, for example, an electrical circuit (an electronic circuit), etc. The processor 72 may include, for example, a CPU (Central Processing Unit), etc.

The processing device 70 may include memory 73. The memory 73 is configured to store the information (the data) described above. The memory 73 may include, for example, at least one of a magnetic recording device or a semiconductor memory device. The memory 73 may include, for example, at least one of ROM (Read Only Memory) or RAM (Random Access Memory). The processing device 70 may include a display part 74, etc. The display part 74 may have an input function.

Second Embodiment

A second embodiment relates to a measurement method. At least a portion of the processing and the measurement described in reference to the first embodiment may be performed in the measurement method according to the embodiment.

The first operation OP1 is performed in the measurement method according to the embodiment. The first image data Di1, the second image data Di2, and the third image data Di3 are acquired in the first operation OP1 (step S11 of FIG. 1). The first derived data Dd1 is derived based on the first to third image data Di1 to Di3 in the first operation OP1 (step S12 of FIG. 1).

As described with reference to FIG. 3B, the first image data Di1 includes data related to the first object member image 41a of the object member 41 transmitting the first light L1 including the first pattern from the first background image 11a in the first image data Di1. The first image data Di1 may include data related to the first background image 11a in the first image data Di1 and the first object member image 41a of the object member 41 transmitting the first light L1 including the first pattern from the first background image 11a in the first image data Di1.

As described with reference to FIG. 3C, the second image data Di2 includes data related to the second object member image 41b of the object member 41 transmitting the second light L2 including the first pattern from the first background image 11b in the second image data Di2. The second image data Di2 may include data related to the first background image 11b in the second image data Di2 and the second object member image 41b of the object member 41 transmitting the second light L2 including the first pattern from the first background image 11b in the second image data Di2.

As described with reference to FIG. 3D, the third image data Di3 includes data related to the third object member image 41c of the object member 41 transmitting the third light L3 including the first pattern from the first background image 11c in the third image data Di3. The third image data Di3 may include data related to the first background image 11c in the third image data Di3 and the third object member image 41c of the object member 41 transmitting the third light L3 including the first pattern from the first background image 11c in the third image data Di3.

The second relative position RP2 between the first background image 11b in the second image data Di2 and the object member 41 in the second image data Di2 is different from the first relative position RP1 between the first background image 11a in the first image data Di1 and the object member 41 in the first image data Di1. The third relative position RP3 between the first background image 11c in the third image data Di3 and the object member 41 in the third image data Di3 is different from the first relative position RP1 and different from the second relative position RP2.

In the first operation OP1 of the measurement method according to the embodiment, the first derived data Dd1 may be derived based on the first difference $\Delta x1$ between the first relative position RP1 and the second relative position RP2 and the second difference $\Delta x2$ between the first relative position RP1 and the third relative position RP3. The first derived data Dd1 includes data related to the displacement amount $\lambda p$ of the first pattern. The first derived relative position RPp1 between the first background image 11 and the object member 41 in the derivation of the first derived data Dd1 is different from the second relative position RP2 and different from the third relative position RP3.

In the measurement method according to the embodiment, the first light L1 is along the first direction (e.g., the Z-axis direction) from the first background image 11 toward the object member 41 in the first image data Di1 (see FIG. 2A). The second relative position RP2 is different from the first relative position RP1 in the second direction that crosses the first direction (see FIG. 2B). The second direction is along one direction (e.g., the X-axis direction) along, for example, the X-Y plane. The third relative position RP3 is different from the first relative position RP1 in the second direction (see FIG. 2C).

The first derived relative position RPp1 is different from the second relative position RP2 in the second direction and different from the third relative position RP3 in the second direction (see FIG. 4). The absolute value of the difference $\Delta xp$ between the first relative position RP1 and the first derived relative position RPp1 is less than the absolute value of the first difference $\Delta x1$ and less than the absolute value of the second difference $\Delta x2$ (see FIG. 4).

In the measurement method according to the embodiment, for example, the absolute value of the difference $\Delta xp$ between the first relative position RP1 and the first derived relative position RPp1 is not more than 5 times the length of the pitch pp1 in the second direction in the image of the first image data Di1 of (see FIG. 5) of the multiple pixels 51x of the first imager 51 that acquires the first image data Di1, the second image data Di2, and the third image data Di3.

In the measurement method according to the embodiment, for example, the absolute value of the first difference $\Delta x1$ and the absolute value of the second difference $\Delta x2$ are greater than 5 times the length of the pitch pp1 in the image of the first image data Di1.

For example, there are cases where the movement amount of the relative position between the first background image 11 and the object member 41 is limited by the moving part of the first background image 11, the pixel pitch of the display device for the first background image 11, etc. According to the embodiment, the measured value can be derived at any movement amount.

In one example according to the embodiment, the object member 41 may be, for example, a solid (e.g., an optical component, etc.). In another example according to the embodiment, the object member 41 may be a liquid or a gas.

When the object member 41 is a solid, a liquid, or a gas, the position of the object member 41 is the spatial position of the solid, the liquid, or the gas.

Embodiments may include the following configurations.

Configuration 1

A processing device, comprising:
an acquisition part; and
a processor,
the acquisition part and the processor being configured to perform a first operation,
the acquisition part being configured to acquire first image data, second image data, and third image data in the first operation,
the first image data including data related to a first object member image of an object member transmitting a first light, the first light including a first pattern from a first background image in the first image data,
the second image data including data related to a second object member image of the object member transmitting a second light, the second light including the first pattern from the first background image in the second image data,
the third image data including data related to a third object member image of the object member transmitting a third light, the third light including the first pattern from the first background image in the third image data,
a second relative position between the first background image in the second image data and the object member in the second image data being different from a first relative position between the first background image in the first image data and the object member in the first image data,
a third relative position between the first background image in the third image data and the object member in the third image data being different from the first relative position and different from the second relative position,
the processor being configured to derive first derived data based on the first, second, and third image data in the first operation.

Configuration 2

The processing device according to Configuration 1, wherein
the processor is configured to derive the first derived data based on a first difference and a second difference in the first operation,
the first difference is between the first relative position and the second relative position,
the second difference is between the first relative position and the third relative position,
the first derived data includes data related to a displacement amount of the first pattern, and
a first derived relative position between the first background image and the object member in the deriving of the first derived data is different from the second relative position and different from the third relative position.

Configuration 3

The processing device according to Configuration 2, wherein
the first light is along a first direction from the first background image toward the object member in the first image data,
the second relative position is different from the first relative position in a second direction crossing the first direction, and
the third relative position is different from the first relative position in the second direction.

Configuration 4

The processing device according to Configuration 3, wherein
the first derived relative position is different from the second relative position in the second direction and different from the third relative position in the second direction.

Configuration 5

The processing device according to any one of Configurations 2 to 4, wherein
an absolute value of a difference between the first relative position and the first derived relative position is less than an absolute value of the first difference and less than an absolute value of the second difference.

Configuration 6

The processing device according to Configuration 5, wherein
the absolute value of the difference between the first relative position and the first derived relative position is not more than 5 times a length of a pitch in the second direction of a plurality of pixels of a first imager in an image of the first image data, and
the first imager acquires the first, second, and third image data.

Configuration 7

The processing device according to Configuration 5, wherein
the absolute value of the first difference and the absolute value of the second difference are greater than 5 times a length of a pitch in the second direction of a plurality of pixels of a first imager in an image of the first image data, and
the first imager acquires the first, second, and third image data.

Configuration 8

The processing device according to any one of Configurations 1 to 7, wherein
the first image data, the second image data, and the third image data are acquired based on first stored data, and
the first stored data includes information related to a plurality of relative positions related to the first background image and the object member.

Configuration 9

The processing device according to Configuration 8, wherein
the acquisition part is configured to acquire a plurality of sets of image data in the first operation,
one of the plurality of sets of image data includes data related to the first background image in one of a plurality of states and related to an image of the object member transmitting light from the first background image in the one of the plurality of states,
the processor includes deriving the first derived data based on the plurality of sets of image data and at least a portion of the first stored data in the first operation, and
the processor is configured to output information related to insufficient data in the first operation by comparing the plurality of sets of image data and the at least a portion of the first stored data.

Configuration 10

The processing device according to any one of Configurations 1 to 9, wherein
the acquisition part and the processor also are configured to perform a second operation, the acquisition part is configured to acquire fourth image data, fifth image data, and sixth image data in the second operation, the fourth image data includes data related to a fourth object member image of the object member transmitting a fourth light, the fourth light includes a second pattern from a second background image in the fourth image data, the fifth image data includes data related to a fifth object member image of the object member transmitting a fifth light, the fifth light includes the second pattern from the second background image in the fifth image data, the sixth image data includes data related to a sixth object member image of the object member transmitting a sixth light, the sixth light includes the second pattern from the second background image in the sixth image data, a fifth relative position between the second background image in the fifth image data and the object member in the fifth image data is different from a fourth relative position between the second background image in the fourth image data and the object member in the fourth image data, a sixth relative position between the second background image in the sixth image data and the object member in the sixth image data is different from the fourth relative position and different from the fifth relative position, the processor is configured to derive second derived data based on the fourth, fifth, and sixth image data in the second operation, the second derived data includes data related to a displacement amount of the second pattern, a second derived relative position between the second background image and the object member in the deriving of the second derived data is different from the fifth relative position and different from the sixth relative position, the processor is configured to output third derived data in the second operation, and the third derived data includes a difference between the first derived data and the second derived data.

Configuration 11

The processing device according to Configuration 10, wherein the fourth image data further includes data related to the second background image in the fourth image data, the fifth image data further includes data related to the second background image in the fifth image data, and the sixth image data further includes data related to the second background image in the sixth image data.

Configuration 12

The processing device according to Configuration 10 or 11, wherein a polarization direction of the first light crosses a polarization direction of the fourth light.

Configuration 13

The processing device according to any one of Configurations 1 to 12, wherein the first image data further includes data related to the first background image in the first image data, the second image data further includes data related to the first background image in the second image data, and the third image data further includes data related to the first background image in the third image data.

Configuration 14

A measurement device, comprising:

the processing device according to any one of Configurations 1 to 5;

a position modifier configured to modify a relative position between the first background image and the object member; and a first imager configured to acquire the first, second, and third image data.

Configuration 15

The measurement device according to Configuration 14, wherein the processor is configured to control at least one of the position modifier or the first imager.

Configuration 16

A measurement method comprising:

performing a first operation, the first operation including acquiring first image data, second image data, and third image data, and deriving first derived data based on the first, second, and third image data, the first image data including data related to a first object member image of an object member transmitting a first light, the first light including a first pattern from a first background image in the first image data, the second image data including data related to a second object member image of the object member transmitting a second light, the second light including the first pattern from the first background image in the second image data, the third image data including data related to a third object member image of the object member transmitting a third light, the third light including the first pattern from the first background image in the third image data, a second relative position between the first background image in the second image data and the object member in the second image data being different from a first relative position between the first background image in the first image data and the object member in the first image data, a third relative position between the first background image in the third image data and the object member in the third image data being different from the first relative position and different from the second relative position.

Configuration 17

The measurement method according to Configuration 16, wherein in the first operation, the first derived data is derived based on a first difference and a second difference, the first difference is between the first relative position and the second relative position, the second difference is between the first relative position and the third relative position, the first derived data includes data related to a displacement amount of the first pattern, and a first derived relative position between the first background image and the object member in the deriving of the first derived data is different from the second relative position and different from the third relative position.

Configuration 18

The measurement method according to Configuration 17, wherein
the first light is along a first direction from the first background image toward the object member in the first image data,
the second relative position is different from the first relative position in a second direction crossing the first direction, and
the third relative position is different from the first relative position in the second direction.

Configuration 19

The measurement method according to Configuration 18, wherein
the first derived relative position is different from the second relative position in the second direction and different from the third relative position in the second direction.

Configuration 20

The measurement method according to any one of Configurations 16 to 18, wherein
an absolute value of a difference between the first relative position and the first derived relative position is less than an absolute value of the first difference and less than an absolute value of the second difference.

Configuration 21

The measurement method according to Configuration 20, wherein
the absolute value of the difference between the first relative position and the first derived relative position is not more than 5 times a length of a pitch in the second direction of a plurality of pixels of a first imager in an image of the first image data, and
the first imager acquires the first, second, and third image data.

Configuration 22

The processing method according to Configuration 20, wherein
the absolute value of the first difference and the absolute value of the second difference are greater than 5 times a length of a pitch in the second direction of a plurality of pixels of a first imager in an image of the first image data, and
the first imager acquires the first, second, and third image data.

Configuration 23

The processing method according to any one of Configurations 16 to 22, wherein
the first image data further includes data related to the first background image in the first image data,
the second image data further includes data related to the first background image in the second image data, and
the third image data further includes data related to the first background image in the third image data.

According to embodiments, a processing device, a measurement device, and a measurement method can be provided in which the accuracy can be improved.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in processing devices or measurement devices such as acquisition parts, processors, background images, imagers, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all processing devices, measurement devices, and measurement methods practicable by an appropriate design modification by one skilled in the art based on the processing devices, the measurement devices, and the measurement methods described above as embodiments of the invention also are within the scope of the invention to the extent that the purport of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A processing device, comprising:
an acquisition part; and
a processor,
the acquisition part and the processor being configured to perform a first operation,
the acquisition part being configured to acquire first image data, second image data, and third image data in the first operation,
the first image data including data related to a first object member image of an object member transmitting a first light, the first light including a first pattern from a first background image in the first image data,
the second image data including data related to a second object member image of the object member transmitting a second light, the second light including the first pattern from the first background image in the second image data,
the third image data including data related to a third object member image of the object member transmitting a third light, the third light including the first pattern from the first background image in the third image data,
a second relative position between the first background image in the second image data and the object member in the second image data being different from a first relative position between the first background image in the first image data and the object member in the first image data,
a third relative position between the first background image in the third image data and the object member in the third image data being different from the first relative position and different from the second relative position,
the processor being configured to derive first derived data based on the first, second, and third image data in the first operation, wherein
the processor is configured to derive the first derived data based on a first difference and a second difference in the first operation,
the first difference is between the first relative position and the second relative position,
the second difference is between the first relative position and the third relative position,
the first derived data includes data related to a displacement amount of the first pattern, and
a first derived relative position between the first background image and the object member in the deriving of the first derived data is different from the second relative position and different from the third relative position.

2. The device according to claim 1, wherein
the first light is along a first direction from the first background image toward the object member in the first image data,
the second relative position is different from the first relative position in a second direction crossing the first direction, and
the third relative position is different from the first relative position in the second direction.

3. The device according to claim 2, wherein
the first derived relative position is different from the second relative position in the second direction and different from the third relative position in the second direction.

4. The device according to claim 1, wherein
an absolute value of a difference between the first relative position and the first derived relative position is less than an absolute value of the first difference and less than an absolute value of the second difference.

5. The device according to claim 4, wherein
the absolute value of the difference between the first relative position and the first derived relative position is not more than 5 times a length of a pitch in the second direction of a plurality of pixels of a first imager in an image of the first image data, and
the first imager acquires the first, second, and third image data.

6. The device according to claim 4, wherein
the absolute value of the first difference and the absolute value of the second difference are greater than 5 times a length of a pitch in the second direction of a plurality of pixels of a first imager in an image of the first image data, and
the first imager acquires the first, second, and third image data.

7. A processing device, comprising:
an acquisition part; and
a processor,
the acquisition part and the processor being configured to perform a first operation,
the acquisition part being configured to acquire first image data, second image data, and third image data in the first operation,
the first image data including data related to a first object member image of an object member transmitting a first light, the first light including a first pattern from a first background image in the first image data,
the second image data including data related to a second object member image of the object member transmitting a second light, the second light including the first pattern from the first background image in the second image data,
the third image data including data related to a third object member image of the object member transmitting a third light, the third light including the first pattern from the first background image in the third image data,
a second relative position between the first background image in the second image data and the object member in the second image data being different from a first relative position between the first background image in the first image data and the object member in the first image data,
a third relative position between the first background image in the third image data and the object member in the third image data being different from the first relative position and different from the second relative position,
the processor being configured to derive first derived data based on the first, second, and third image data in the first operation,
wherein
the first image data, the second image data, and the third image data are acquired based on first stored data, and
the first stored data includes information related to a plurality of relative positions related to the first background image and the object member,
wherein
the acquisition part is configured to acquire a plurality of sets of image data in the first operation,
one of the sets of image data includes data related to the first background image in one of a plurality of states and related to an image of the object member transmitting light from the first background image in the one of the states,
the processor includes deriving the first derived data based on the sets of image data and at least a portion of the first stored data in the first operation, and
the processor is configured to output information related to insufficient data in the first operation by comparing the sets of image data and the at least a portion of the first stored data.

8. A processing device, comprising:
an acquisition part; and
a processor,
the acquisition part and the processor being configured to perform a first operation,
the acquisition part being configured to acquire first image data, second image data, and third image data in the first operation,
the first image data including data related to a first object member image of an object member transmitting a first light, the first light including a first pattern from a first background image in the first image data,
the second image data including data related to a second object member image of the object member transmitting a second light, the second light including the first pattern from the first background image in the second image data,
the third image data including data related to a third object member image of the object member transmitting a third light, the third light including the first pattern from the first background image in the third image data,
a second relative position between the first background image in the second image data and the object member in the second image data being different from a first relative position between the first background image in the first image data and the object member in the first image data, a third relative position between the first background image in the third image data and the object member in the third image data being different from the first relative position and different from the second relative position, the processor being configured to derive first derived data based on the first, second, and third image data in the first operation, wherein the acquisition part and the processor also are configured to perform a second operation, the acquisition part is configured to acquire fourth image data, fifth image data, and sixth image data in the second operation, the fourth image data includes data related to a fourth object member image of the object member transmitting a fourth light, the fourth light includes a second pattern from a second background image in the fourth image data, the fifth image data includes data related to a fifth object member image of the object member transmitting a fifth light, the fifth light includes the second pattern from the second background image in the fifth image data, the sixth image data includes data related to a sixth object member image of the object member transmitting a sixth light, the sixth light includes the second pattern from the second background image in the sixth image data, a fifth relative position between the second background image in the fifth image data and the object member in the fifth image data is different from a fourth relative position between the second background image in the fourth image data and the object member in the fourth image data, a sixth relative position between the second background image in the sixth image data and the object member in the sixth image data is different from the fourth relative position and different from the fifth relative position, the processor is configured to derive second derived data based on the fourth, fifth, and sixth image data in the second operation, the second derived data includes data related to a displacement amount of the second pattern, a second derived relative position between the second background image and the object member in the deriving of the second derived data is different from the fifth relative position and different from the sixth relative position, the processor is configured to output third derived data in the second operation, and the third derived data includes a difference between the first derived data and the second derived data.

9. The device according to claim 8, wherein the fourth image data further includes data related to the second background image in the fourth image data, the fifth image data further includes data related to the second background image in the fifth image data, and the sixth image data further includes data related to the second background image in the sixth image data.

10. The device according to claim 8, wherein a polarization direction of the first light crosses a polarization direction of the fourth light.

11. The device according to claim 1, wherein the first image data further includes data related to the first background image in the first image data, the second image data further includes data related to the first background image in the second image data, and the third image data further includes data related to the first background image in the third image data.

12. A measurement device, comprising:

the processing device according to claim 1;

a position modifier configured to modify a relative position between the first background image and the object member; and a first imager configured to acquire the first, second, and third image data.

13. The device according to claim 12, wherein the processor is configured to control at least one of the position modifier or the first imager.

14. A measurement method comprising:

performing a first operation, the first operation including acquiring first image data, second image data, and third image data, and deriving first derived data based on the first, second, and third image data, the first image data including data related to a first object member image of an object member transmitting a first light, the first light including a first pattern from a first background image in the first image data, the second image data including data related to a second object member image of the object member transmitting a second light, the second light including the first pattern from the first background image in the second image data, the third image data including data related to a third object member image of the object member transmitting a third light, the third light including the first pattern from the first background image in the third image data, a second relative position between the first background image in the second image data and the object member in the second image data being different from a first relative position between the first background image in the first image data and the object member in the first image data, a third relative position between the first background image in the third image data and the object member in the third image data being different from the first relative position and different from the second relative position, wherein in the first operation, the first derived data is derived based on a first difference and a second difference, the first difference is between the first relative position and the second relative position, the second difference is between the first relative position and the third relative position, the first derived data includes data related to a displacement amount of the first pattern, and a first derived relative position between the first background image and the object member in the deriving of the first derived data is different from the second relative position and different from the third relative position.

15. The method according to claim 14, wherein the first light is along a first direction from the first background image toward the object member in the first image data, the second relative position is different from the first relative position in a second direction crossing the first direction, and the third relative position is different from the first relative position in the second direction.

16. The method according to claim 15, wherein
the first derived relative position is different from the second relative position in the second direction and different from the third relative position in the second direction.

17. A measurement method comprising:
performing a first operation,
the first operation including
   acquiring first image data, second image data, and third image data, and
   deriving first derived data based on the first, second, and third image data,
the first image data including data related to a first object member image of an object member transmitting a first light,
the first light including a first pattern from a first background image in the first image data,
the second image data including data related to a second object member image of the object member transmitting a second light,
the second light including the first pattern from the first background image in the second image data,
the third image data including data related to a third object member image of the object member transmitting a third light,
the third light including the first pattern from the first background image in the third image data,
a second relative position between the first background image in the second image data and the object member in the second image data being different from a first relative position between the first background image in the first image data and the object member in the first image data,
a third relative position between the first background image in the third image data and the object member in the third image data being different from the first relative position and different from the second relative position,
wherein
an absolute value of a difference between the first relative position and the first derived relative position is less than an absolute value of the first difference and less than an absolute value of the second difference.

* * * * *